United States Patent
Higashikata

(10) Patent No.: US 7,586,643 B2
(45) Date of Patent: Sep. 8, 2009

(54) COLOR PROCESSING DEVICE AND METHOD FOR AN OUTPUT DEVICE THAT ADJUSTS THE QUANTITY OF TOTAL INK BASED ON THE QUANTITY OF BLACK INK IN AN INPUT SIGNAL

(75) Inventor: Ryosuke Higashikata, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 561 days.

(21) Appl. No.: 11/320,341

(22) Filed: Dec. 29, 2005

(65) Prior Publication Data

US 2006/0262332 A1 Nov. 23, 2006

(30) Foreign Application Priority Data

May 20, 2005 (JP) .............................. 2005-147597

(51) Int. Cl.
*H04N 1/60* (2006.01)
(52) U.S. Cl. ..................... 358/1.9; 358/515; 358/518
(58) Field of Classification Search ............... 358/1.9, 358/2.1, 3.23, 3.06, 504, 518, 520, 521, 523, 358/525; 382/162, 165, 167; 345/590–591, 345/593, 601–604
See application file for complete search history.

(56) References Cited

U.S. PATENT DOCUMENTS

| | | | | |
|---|---|---|---|---|
| 5,402,253 A * | 3/1995 | Seki | ............................. | 358/518 |
| 7,012,714 B2 * | 3/2006 | Higashikata et al. | .......... | 358/1.9 |
| 7,307,753 B2 * | 12/2007 | Sasaki et al. | .................. | 358/1.9 |
| 7,436,543 B2 * | 10/2008 | Yamamoto et al. | ............ | 358/1.9 |
| 2003/0072018 A1 * | 4/2003 | Sasaki et al. | .................. | 358/1.9 |
| 2004/0136014 A1 * | 7/2004 | Maltz | .......................... | 358/1.9 |
| 2005/0036161 A1 * | 2/2005 | Sasaki | .......................... | 358/1.9 |
| 2005/0046882 A1 * | 3/2005 | Kobayashi | ................... | 358/1.9 |
| 2005/0083371 A1 * | 4/2005 | DeBaer | ........................ | 347/43 |
| 2005/0179915 A1 * | 8/2005 | Tsukada | ...................... | 358/1.9 |
| 2006/0250624 A1 * | 11/2006 | Spaulding et al. | ............ | 358/1.9 |

FOREIGN PATENT DOCUMENTS

| | | |
|---|---|---|
| JP | A 10-262157 | 9/1998 |
| JP | A 2004-112269 | 4/2004 |
| JP | A 2005-64774 | 3/2005 |

* cited by examiner

*Primary Examiner*—Benny Q Tieu
*Assistant Examiner*—Christopher W Mutz
(74) *Attorney, Agent, or Firm*—Oliff & Berridge, PLC

(57) ABSTRACT

According to an aspect of the present invention, a color processing device a control unit and a black ink control unit. The control unit controls quantity of total ink used for outputting an image by an output device, and the quantity of total ink is decided based on quantity of black ink of a input signal. The black ink control unit controls quantity of black ink used for outputting the image by the output device. The quantity of total ink includes the quantity of black ink used for outputting the image by the output device.

9 Claims, 6 Drawing Sheets

| CYAN (C) | MAGENTA (M) | YELLOW (Y) | BLACK (K) |
|---|---|---|---|
| 100.000 | 100.000 | 100.000 | 0.000 |
| 100.000 | 100.000 | 100.000 | 5.000 |
| 100.000 | 100.000 | 100.000 | 10.000 |
| 100.000 | 100.000 | 100.000 | 15.000 |
| 100.000 | 100.000 | 100.000 | 20.000 |
| 98.333 | 98.333 | 98.333 | 25.000 |
| 96.667 | 96.667 | 96.667 | 30.000 |
| 95.000 | 95.000 | 95.000 | 35.000 |
| 98.333 | 98.333 | 98.333 | 40.000 |
| 91.667 | 91.667 | 91.667 | 45.000 |
| 90.000 | 90.000 | 90.000 | 50.000 |
| 88.333 | 88.333 | 88.333 | 55.000 |
| 86.667 | 86.667 | 86.667 | 60.000 |
| 85.000 | 85.000 | 85.000 | 65.000 |
| 83.333 | 83.333 | 83.333 | 70.000 |
| 81.667 | 81.667 | 81.667 | 75.000 |
| 80.000 | 80.000 | 80.000 | 80.000 |
| 78.333 | 78.333 | 78.333 | 85.000 |
| 76.667 | 76.667 | 76.667 | 90.000 |
| 75.000 | 75.000 | 75.000 | 95.000 |
| 73.333 | 73.333 | 73.333 | 100.000 |

LOWER SIDE COLOR GAMUT
SURFACES INTERSECT

COLOR PROCESSING DEVICE AND METHOD FOR AN OUTPUT DEVICE THAT ADJUSTS THE QUANTITY OF TOTAL INK BASED ON THE QUANTITY OF BLACK INK IN AN INPUT SIGNAL

BACKGROUND

1. Technical Field

The present invention relates to a color processing technique which converts a target device color signal in a target device in a color space in N (N≧4) dimensions or more including black ink to an output device color signal in an output device in a color space in M (M≧4) dimensions or more including black ink or is used for conversion.

More specifically, the present invention relates to a color processing technique in which when a color outputted from a target device is simulated by an output device, the color is reproduced at high accuracy with satisfactory gradation by the output device on which a color material total quantity is limited while holding the black ink pattern of the target device insofar as possible.

2. Related Art

There is a technique for simulating color reproduction of a target device by a output device using four or more color inks such as CMYK including black ink.

The color reproduction characteristic of the target device and that of the output device are generally different. When attempting to directly use the black ink pattern of the target device in the output device for simulating color reproduction in the target device, the color gamut reproducible by the output device cannot be effectively used. In many cases, quantity of color material used for simulation by a xerography printer or an ink jet printer is limited. The limited quantity increases the difference in the color reproduction characteristic between the target device and the output device.

To realize high precision ink simulation by holding the black ink pattern of the target device, a technique is needed to hold quantity of black ink in the output device.

As such the technique, there is a method described in Japanese Published Unexamined Patent Application No. 2004-112269. In the method described in Japanese Published Unexamined Patent Application No. 2004-112269, a color signal in a device-dependent color space of a target device (hereinafter, called a device color signal) is converted to a color signal in a device-independent color space (hereinafter, called a device-independent color signal), thereby calculating a minimum black ink quantity required to satisfy a color material total quantity limit which can reproduce the device-independent color signal by an output device. A black ink quantity is determined from the minimum black ink quantity required and the black ink quantity of the target device color signal according to chroma. An output device color signal is calculated from the target device-independent color signal and the calculated black ink quantity.

In the method described in Japanese Published Unexamined Patent Application No. 2004-112269, the minimum black ink quantity required is calculated by search in the device-independent color space, resulting in longer processing time. To address such problem, there is a method described in Japanese Published Unexamined Patent Application No. 2005-064774. In Japanese Published Unexamined Patent Application No. 2004-112269, the minimum black ink quantity required to satisfy the color material total quantity limit which can reproduce the target device-independent color signal by the output device is calculated in a search manner. Instead of that, the method of Japanese Published Unexamined Patent Application No. 2005-064774 constructs a model which calculates a pair of any device-independent color signal and a minimum black ink quantity required to calculate the minimum black ink quantity required from the device-independent color signal so that this model is used to calculate the minimum black ink quantity required at high speed.

Here, the pair of the device-independent color signal and the minimum black ink quantity required can be made by a device-independent color signal corresponding to an output device color signal in which any color material except for black ink is 100% or is equal to a color material total quantity limit value and a corresponding black ink quantity.

FIGS. 9A and 9B are explanatory views of the changes of lower side color gamut surfaces in a color gamut when a black ink quantity is changed in a device-independent color space. In FIG. 9A, a device-independent color signal corresponding to an output device color signal in which any color material except for black ink is 100% or is equal to a color material total quantity limit value is indicated by a black circle. The lower side color gamut surface in which the black circles (device-independent color signals) corresponding to each black ink quantity exist is indicated by a solid line. The black ink quantity corresponding to the lower side color gamut surface in which the respective black circles exist is a minimum black ink quantity required corresponding to the device-independent color signal.

According to the above-described related art, utilizing the color gamut of the output device effectively, color reproduction of the target device can be simulated at high accuracy while holding the black ink pattern of the target device insofar as possible.

However, color reverse can occur by increasing the quantity of a black ink, when there occurs a state in which the color material total quantity is limited on a lower side color gamut surface corresponding to a certain black ink quantity and the color material total quantity is not limited on a lower side color gamut surface corresponding to a different black ink quantity. For example, in FIG. 9B, the color material total quantity is not limited on K=0 to 25% and the color material total quantity is limited on K=50 to 100%. In this case, the lower side color gamut surface of K=25% and the lower side color gamut surface of K=50% are intersected with each other. Even when the color material total quantity is limited on all the lower side color gamut surfaces corresponding to respective black ink quantities, the lower side color gamut surfaces can intersect each other depending on the characteristic of the respective color materials used in the output device.

The intersection of the lower side color gamut surfaces means that the device-independent color signals corresponding to an intersecting point allow two or more black ink quantities matched with each other. When a model is created by a device-independent color signal and minimum quantity of black ink to be required, the minimum quantity of the black ink will be different from quantity to be expected. When a target device color signal is converted to an output device color signal based on the black ink quantity different from the expected black ink quantity, the color reproduction accuracy can be lowered or the gradation can be deteriorated.

The phenomenon in which a minimum black ink quantity required is not changed monotonously in a device-independent color space is a problem for the method of utilizing the model predicting a minimum black ink quantity required from a device-independent color signal using a lower side color gamut surface, as described in Japanese Published Unexamined Patent Application No. 2005-064774. The phenomenon is also a problem in the method described in Japanese Published Unexamined Patent Application No. 2004-112269. Dichotomizing search cannot be used when a minimum black ink quantity required is searched or a minimum black ink quantity required searched to continuous device-independent color signals can cause a gap.

SUMMARY

According to an aspect of the present invention, a color processing device a control unit and a black ink control unit. The control unit controls quantity of total ink used for outputting an image by an output device, and the quantity of total ink is decided based on quantity of black ink of a input signal. The black ink control unit controls quantity of black ink used for outputting the image by the output device. The quantity of total ink includes the quantity of black ink used for outputting the image by the output device.

BRIEF DESCRIPTION OF THE DRAWINGS

Embodiments of the present invention will be described in detail based on the following figures, wherein.

DETAILED DESCRIPTION

Figure 1:
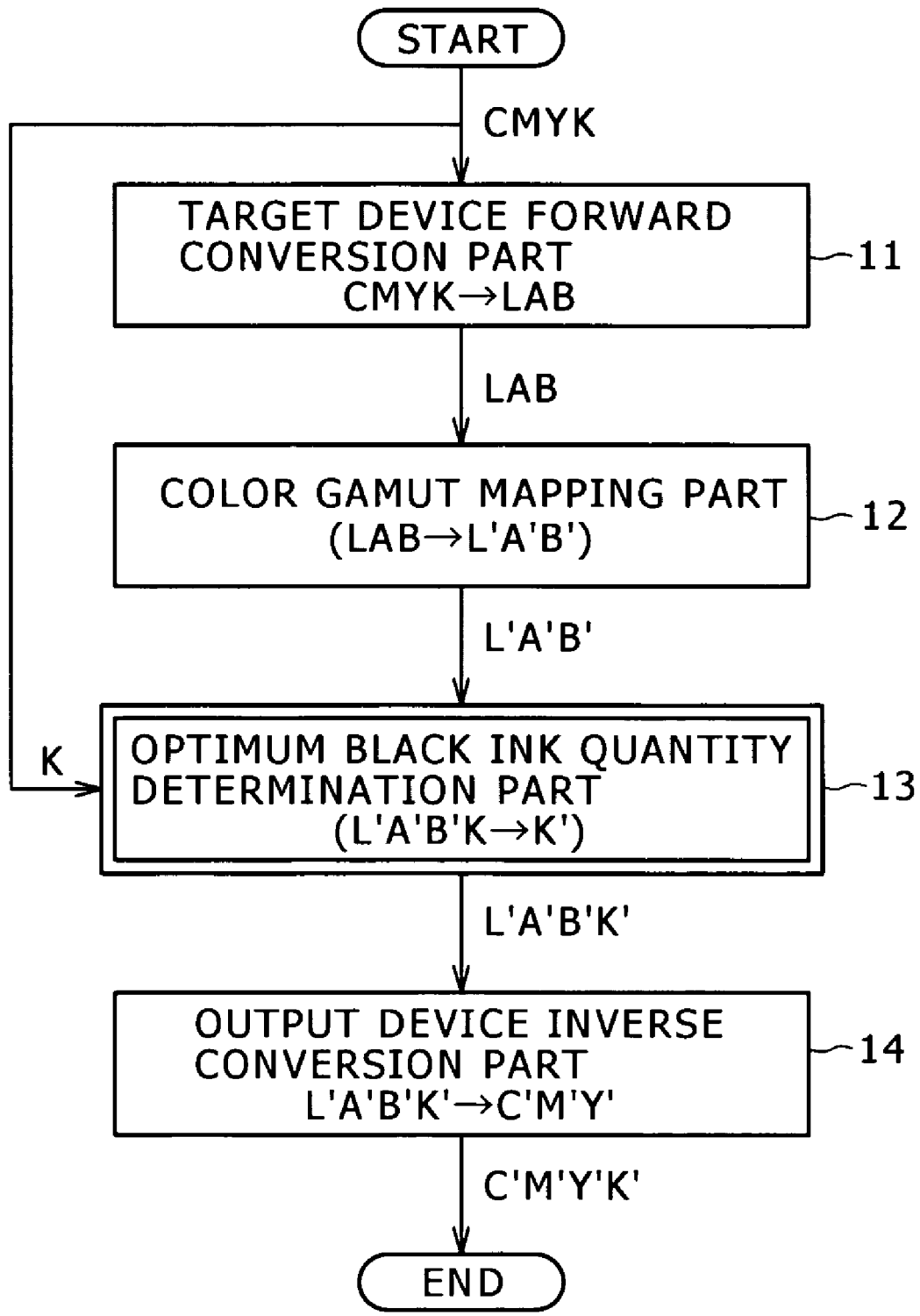
FIG. 1 is a flowchart showing an example of processing.

FIG. 1 is a flowchart showing an aspect of processing according to the present invention. In the drawing, the reference numeral 11 denotes a process of a target device forward conversion part, the reference numeral 12 denotes a process of a color gamut mapping part, the reference numeral 13 denotes a process of an optimum black ink quantity determination part, and the reference numeral 14 denotes a process of an output device reverse conversion part. In the following description, a target device is a CMYK printing machine, an output device is a CMYK printer, and a target device color signal (CMYK) is converted to an output device color signal (C'M'Y'K') , for example. The target device color signal is converted to the output device color signal to hold a black ink value (hereinafter, a black ink quantity) of the target device color signal. A CIELAB color space is used here as a device-independent color space used in the middle of processing, for example.

The target device forward conversion part 11 converts the target device color signal (CMYK) to a CIELAB color signal as a device-independent color signal according to the color reproduction characteristic of the target device. The converting method can be executed using a model by matrix conversion or neutral network. A recurrence model described in Japanese Published Unexamined Patent Application No. Hei 10-262157 can also be used.

The color gamut mapping part 12 maps the CIELAB color signal (LAB) converted by the target device forward conversion part 11 to the CIELAB color signal (L'A'B') in a color gamut which can be reproduced by the output device. As the mapping method, various known methods can be used.

The optimum black ink quantity determination part 13 calculates a black ink quantity (K') of an output device color signal based on the CIELAB color signal (L'A'B') outputted from the color gamut mapping part 12 and the black ink value of the target device color signal. The detail of the optimum black ink quantity determination part 13 will be described later.

The output device reverse conversion part 14 calculates the output device color signal (C'M'Y'K') based on the color reproduction characteristic of the output device. The output device color signal is calculated based on the optimum black ink quantity (K') in the output device and the CIELAB color signal (L'A'B').

In such construction, the target device color signal (CMYK) can be converted to the output device color signal (CMYK) while holding the black ink quantity of the target device color signal insofar as possible. For instance, using the above construction, the CMYK color signal corresponding to the pixel of a CMYK image may be color-converted directly. Alternatively, a CMYK color signal corresponding to the grid point of a multidimensional lookup table may be color-converted to create the multidimensional lookup table realizing color conversion, and then, a CMYK image may be color-converted using the multidimensional lookup table.

Figure 2:
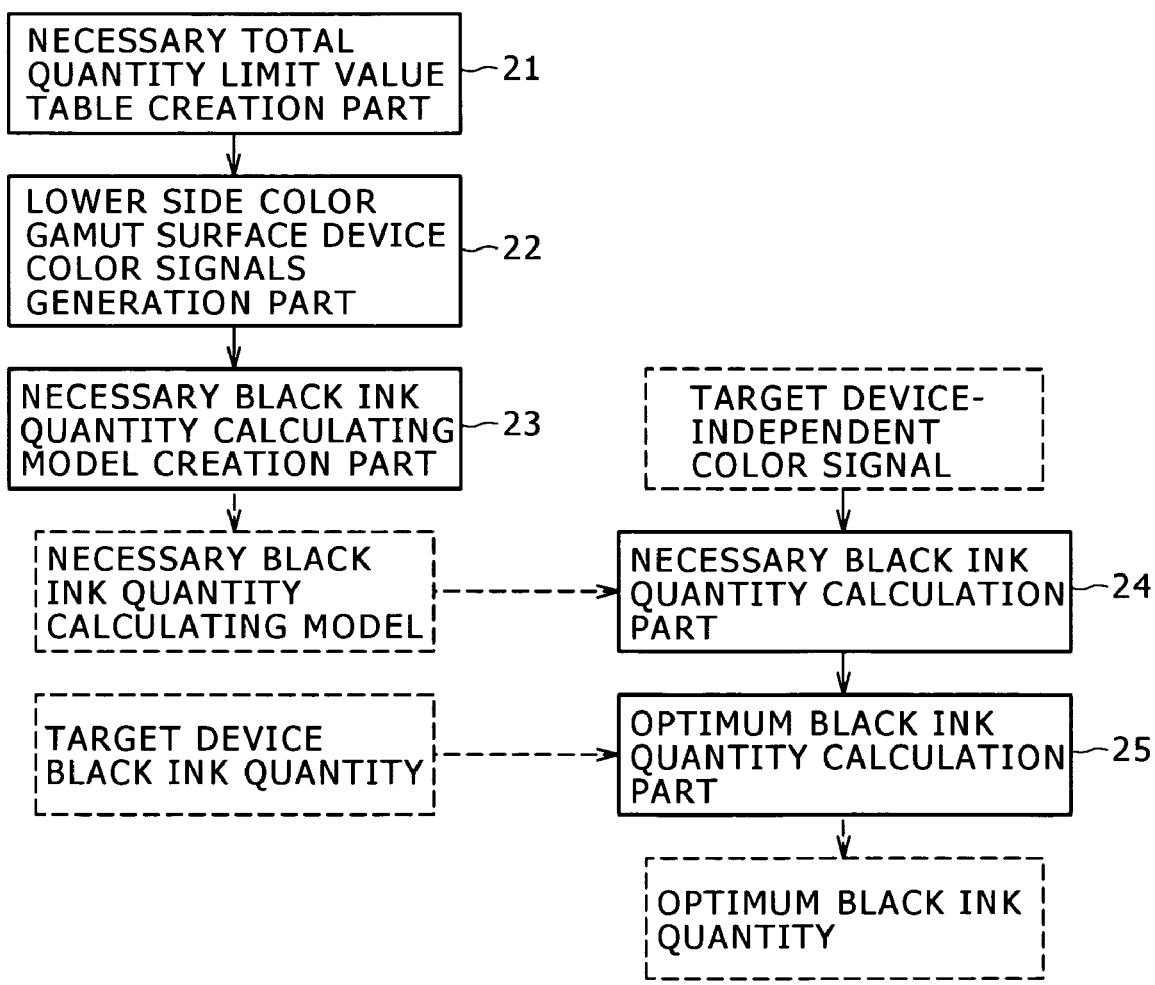
FIG. 2 is a block diagram showing an example of an optimum black ink quantity determination part.

FIG. 2 is a block diagram showing an example of the optimum black ink quantity determination part. In the drawing, the reference numeral 21 denotes a necessary total quantity limit value table creation part, the reference numeral 22 denotes a lower side color gamut surface device color signals generation part, the reference numeral 23 denotes a necessary black ink quantity calculating model creation part, the reference numeral 24 denotes a necessary black ink quantity calculation part, and the reference numeral 25 denotes an optimum black ink quantity calculation part. In the construction shown in FIG. 1, the optimum black ink quantity determination part 13 is given the device-independent CIELAB color signal (L'A'B') (hereinafter, called a device-independent color signal) obtained by converting the target device color signal (CMYK) to the CIELAB color signal (LAB) for color gamut mapping processing and a black ink quantity of the target device color signal.

The necessary total quantity limit value table creation part 21 creates a one-dimensional table which can calculate a necessary total quantity limit value for each black ink quantity so that lower side color gamut surfaces for respective black ink quantities of the output device color signal in the device-independent color space do not intersect each other and calculate a necessary total quantity limit value from any black ink quantity. In this example, in the condition in which the lower side color gamut surfaces for respective black quantities do not intersect each other, the brightness of a point on the lower side color gamut surface in which color components except for black ink of the output device color signal have an equivalent quantity is increased monotonously with reduction in the black ink quantity.

Figures 3, 4:
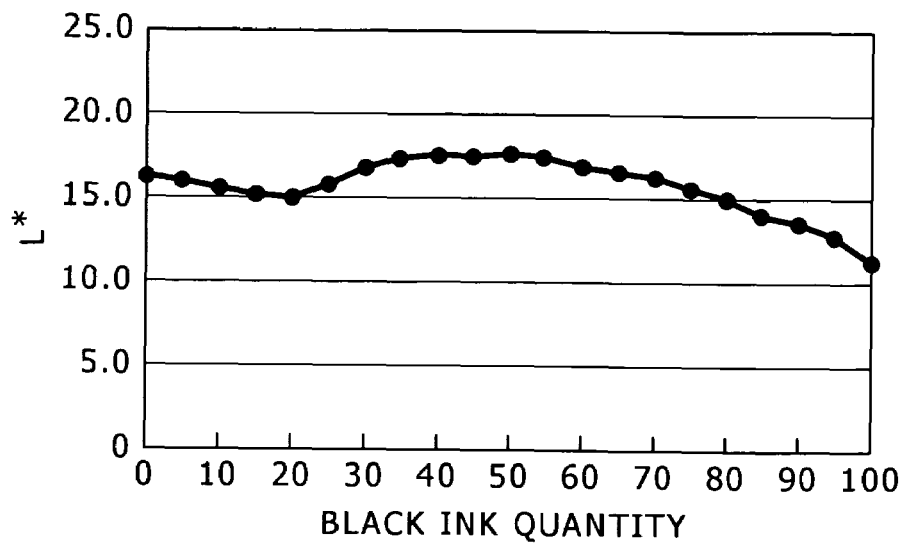
FIG. 3 is a table of an example of CMYK color signals corresponding to points on a lower side color gamut surface in which color materials except for black ink have an equivalent quantity.
FIG. 4 is a graph showing the changes in brightness when the CMYK color signals shown in FIG. 3 are outputted by an output device.

FIG. 3 is a table of an example of CMYK color signals corresponding to points on a lower side color gamut surface in which color materials except for black ink have an equivalent quantity. FIG. 4 is a graph showing the changes in brightness when the CMYK color signals shown in FIG. 3 are outputted by the output device. Here, a color material total quantity limit value of the CMYK printer as the output device is 320%. The color material total quantity limit value is an upper limit value of the total of the values of color components in the output device and indicates that C+M+Y+K≦320% in the CMYK printer. As shown in FIG. 3, the black ink quantity of up to 0 to 20% does not exceed the color material total quantity limit value of 320% when the CMY are 100%, respectively. The black ink quantity above 20% exceeds the color material total quantity limit value of 320% when the CMY are 100%, respectively. The CMY are reduced by an equivalent quantity so that a total thereof is 320%.

The CMYK color signals shown in FIG. 3 are outputted by the CMYK printer as the output device. The measured brightness is as shown in FIG. 4. In other words, the black ink quantity of up to 20% lowers the brightness with increase in the black ink quantity. In the black ink quantity above 20% exceeding the color material total quantity limit value, the brightness is changed to be once increased and then lowered. When the color material total quantity limit value is set to the output device, the brightness is not increased monotonously as the black ink quantity is reduced. This indicates that the intersection of the lower side color gamut surfaces described in FIG. 9B occurs. This phenomenon can be seen from FIG. 4. When such phenomenon occurs, plural black ink quantities for reproducing the same brightness exist and a black ink quantity cannot be determined uniquely.

Figure 9A:
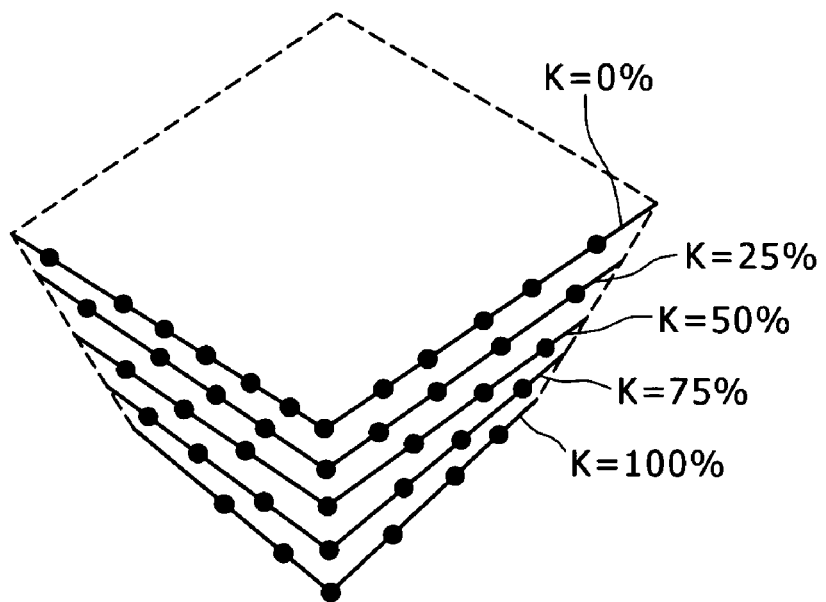
FIGS. 9A and 9B are explanatory views of the changes of lower side color gamut surfaces in a color gamut when a black ink quantity is changed in a device-independent color space.
Figure 9B:
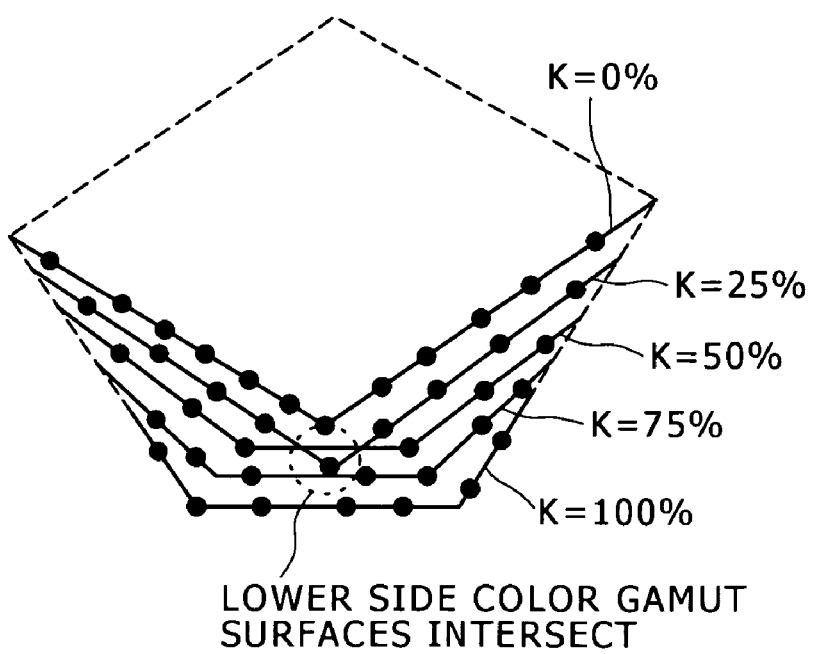

In the present invention, the necessary total quantity limit value according to a black ink quantity is controlled so as not to cause the intersection of the lower side color gamut surfaces described in FIG. 9B. As the graph shown in FIG. 4 increases monotonously (the brightness increases) with reduction in the black ink quantity, the necessary total quantity limit value is controlled. An example of the control of the necessary total quantity limit value will be described below.

Figure 5:
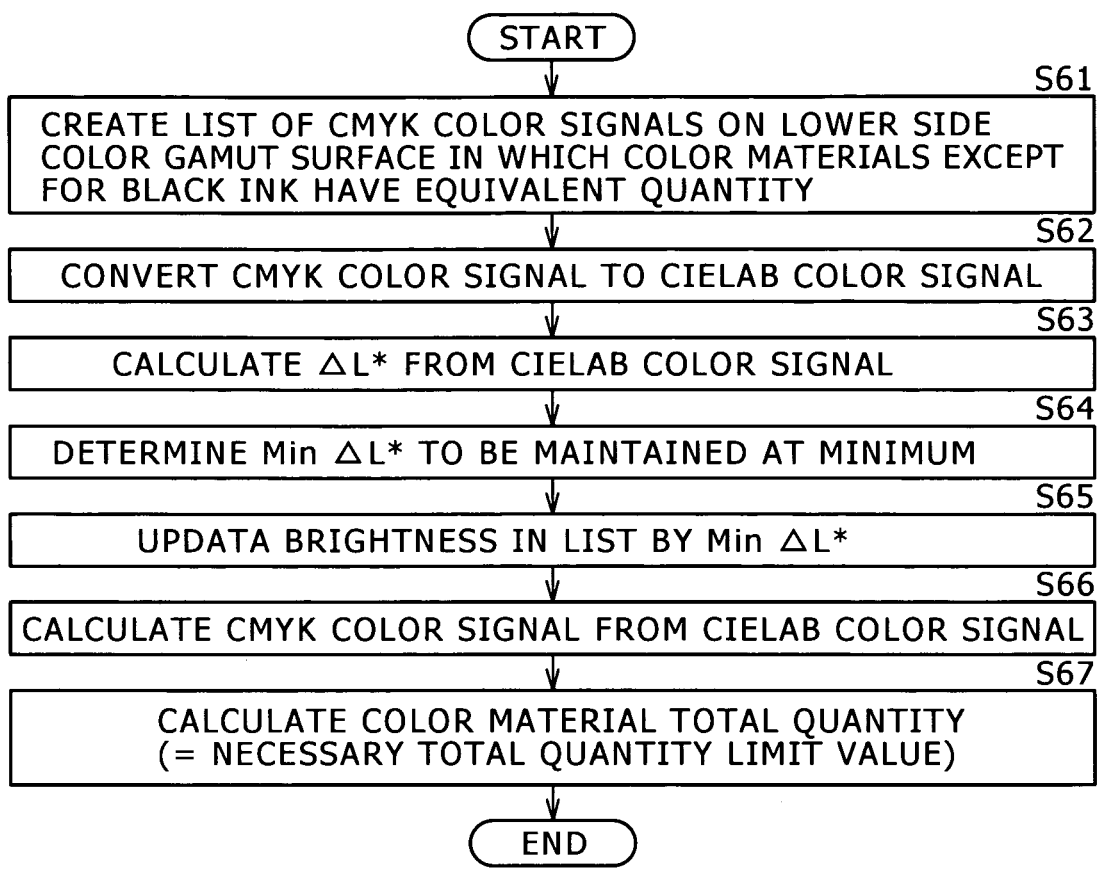
FIG. 5 is a flowchart showing an example of calculating processing of a necessary total quantity limit value according to an embodiment of the present invention.

FIG. 5 is a flowchart showing an example of calculating processing of the necessary total quantity limit value according to an embodiment of the present invention. In S61, a list is created of the CMYK color signals as shown in FIG. 3 on the lower side color gamut surfaces for respective black ink quantities in which color materials except for black ink have an equivalent quantity. In the example shown in FIG. 3, the CMYK color signal on the lower side color gamut surface is generated by the black ink quantity of 5%. Without being limited thereto, the list can be created by any black ink quantity. The CMYK color signal lies on the lower side color gamut surface, which means that any one of C, M, and Y is 100% or is matched with the color material total quantity limit value. When the CMYK color signal to be generated is within the color material total quantity limit value, C=M=Y=100% and, in C=M=Y=100%, C=M=Y=(R−K)/3 for the black ink quantity (K) exceeding the color material total quantity limit value (R).

In S62, the CMYK color signals of the list created in S61 are converted to the CIELAB color signals as the device-independent color signals according to the color reproduction characteristic of the output device. For this conversion, the existing method including the recurrence model described in Japanese Published Unexamined Patent Application No. Hei 10-262157 can be used. By this conversion, the list of CMYK color signals created in S61 is a list of CIELAB color signals (and K signals).

In S63, brightness difference $\Delta L^*$ between the adjacent CIELAB color signals calculated in S62 corresponding to the CMYK color signals in the list created in S61 is calculated.

In S64, when the brightness of the CIELAB color signals corresponding to the black ink quantity according to reduction in the black ink quantity is corrected to increase monotonously, brightness difference Min $\Delta L^*$ that the adjacent CIELAB color signals on the list of the CIELAB color signals created in S61 should maintain at the minimum is determined. Various determining methods can be considered. For instance, an average value of the positive $\Delta L^*$ of the brightness difference $\Delta L^*$ calculated in S63 can be calculated as the brightness difference Min $\Delta L^*$ to be maintained at the minimum. As another determining method, predetermined Min $\Delta L^*$ may be used according to the number of steps of the black ink quantity or the Min $\Delta L^*$ may be averaged by the brightness difference $\Delta L^*$ of only portions in which the original $L^*$ increases monotonously on the basis of the black ink quantity of 100%. When the value of the brightness difference Min $\Delta L^*$ to be maintained at the minimum is too large, a necessary total quantity limit value much stricter than the original color ink total quantity limit value as a condition is applied as the black ink quantity is decreased. The brightness difference Min $\Delta L^*$ to be maintained at the minimum is required to be set to an appropriate value.

In S65, the brightness difference $\Delta L^*$ smaller than the brightness difference Min $\Delta L^*$ to be maintained at the minimum determined in S64 is replaced with the brightness difference Min $\Delta L^*$ to be maintained at the minimum. The brightness ($L^*$) of the CIELAB color signals in the list of CIELAB color signal are updated sequentially as necessary on the basis of the CIELAB color signals corresponding to the black ink quantity of 100%.

Figure 6:
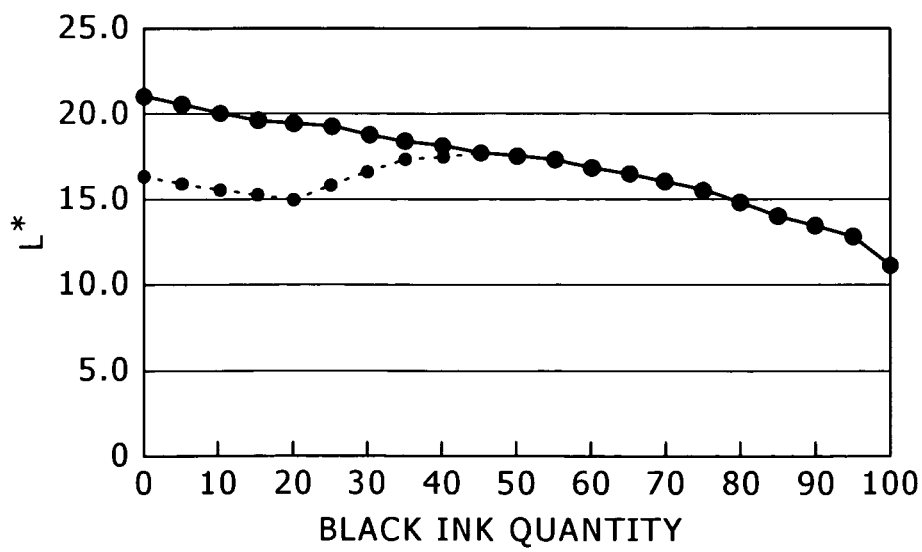
FIG. 6 is a graph of an example of the relation between black ink quantities and brightness of the calculating processing of a necessary total quantity limit value.

FIG. 6 is a graph of an example of the relation between black ink quantities and brightness of the calculating process of the necessary total quantity limit value. By the processing of S61 to S65 of FIG. 5, as indicated by the solid line in FIG. 6, it is possible to create the list of CIELAB color signals in which as the black ink quantity is decreased on the basis of the CIELAB color signal corresponding to the black ink quantity of 100%, the brightness corresponding to the black ink quantity increases monotonously. In the graph shown in FIG. 6, the dotted line indicates the relation between black ink quantities and brightness only in the condition in which the color material total quantity limit value shown in FIG. 4 is 320%. In the above processing, plural black ink quantities having the same brightness cannot exist. As the black ink quantity is decreased while the brightness corresponding to the black ink quantity of 100% remains the same, the brightness corresponding to the black ink quantity is updated to increase monotonously.

Returning to FIG. 5, in S66, the CIELAB color signal in which the brightness ($L^*$) is updated in S65 is converted to the CMYK color signal using the color reproduction characteristic of the output device. In greater detail, the CMY color signal is calculated from the CIELAB color signal and the black ink quantity corresponding to the CIELAB color signal. As this converting method, the existing method including the recurrence model described in Japanese Published Unexamined Patent Application No. Hei 10-262157 can be used.

In S67, the total (C+M+Y+K) in a coverage of the CMYK color signal (CMY color signal and the black ink quantity)

calculated in S66 is calculated. The calculated total is the necessary total quantity limit value according to the black ink quantity.

Figure 7:
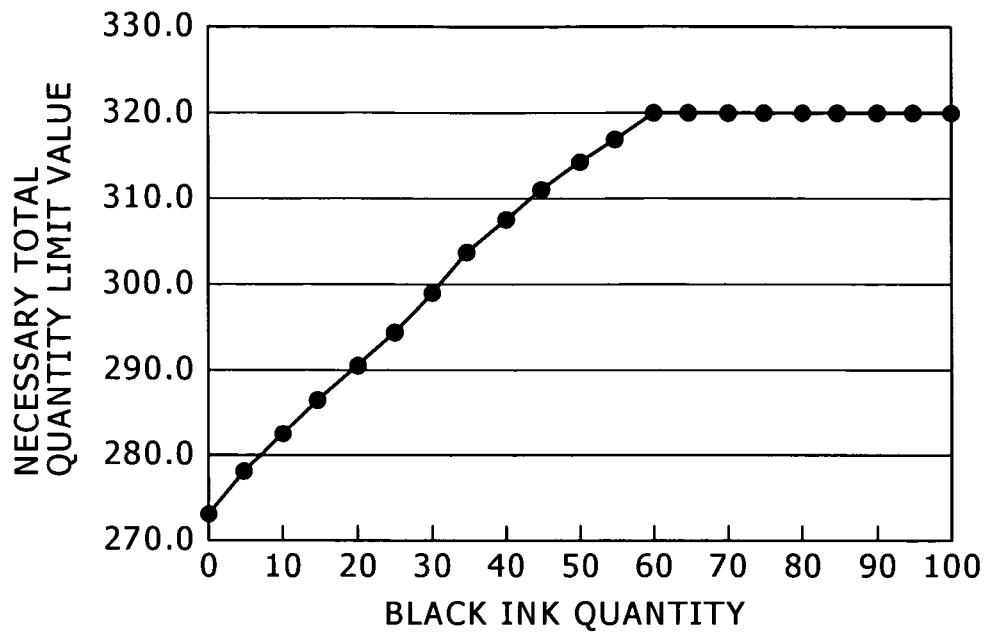
FIG. 7 is a graph showing an example of the relation between black ink quantities and necessary total quantity limit values according to an embodiment of the present invention.

In such a series of processing, a table of the black ink quantity of the CMYK color signal and the necessary total quantity limit value in the black ink quantity can be created. This table is used to calculate the necessary total quantity limit value from any black ink quantity. FIG. 7 is a graph showing an example of the relation between black quantities and necessary total quantity limit values according to an embodiment of the present invention. On the side in which the black ink quantity is close to 100%, the original color material total quantity limit value (320% in this example) in the output device is the necessary total quantity limit value. In the portion in which the brightness is corrected in S65, the necessary total quantity limit value stricter than the color material total quantity limit value is set.

To further smoothen the continuity of the connecting portion of the portion of the original color material total quantity limit value in the output device and the portion to which the stricter necessary total quantity limit value is set, the curve showing the relation between black quantities and necessary total quantity limit values shown in FIG. 7 may be subject to smoothening. As a method of smoothing used at this time, the existing method can be used. For instance, the necessary total quantity limit values to respective black ink quantities except for 0% and 100% at both ends are averaged by the necessary total quantity limit values of the adjacent black ink quantities, thereby realizing smoothing.

As described above, the necessary total quantity limit value table creation part 21 can create a one-dimensional table matching the necessary total quantity limit value necessary for satisfying the condition in which the lower side color gamut surfaces for respective black ink quantities do not intersect each other, with the black ink quantity. The one-dimensional table is a necessary total quantity limit value table.

In the above description, the condition in which the lower side color gamut surfaces for respective black ink quantities do not intersect each other is judged by the fact that the brightness of a point on the lower side color gamut surface in which color signals except for black ink have an equivalent quantity is monotonous. The present invention is not limited thereto. The condition may be judged using another point on the lower side color gamut surfaces for each black ink quantity or may be judged by seeing plural dot lines.

Returning to FIG. 2, the lower side color gamut surface device color signals generation part 22 calculates the necessary total quantity limit value for each black ink quantity using the necessary total quantity limit value table created in the necessary total quantity limit value table creation part 21 and then calculates the CMYK color signals satisfying the necessary total quantity limit value. For instance, the CMYK color signals calculated are assumed to be equal to the lower side color gamut surface and to be points indicated by the black circles in FIG. 9. In other words, the CMYK color signal in which any one of C, M, and Y is 100% or is equal to the necessary total quantity limit value may be calculated. For instance, to the black ink quantity set in predetermined increments such as 10%, the necessary total quantity limit value is calculated using the necessary total quantity limit value table. C, M, and Y which can be created within the CMY total quantity value obtained by subtracting the corresponding black quantity from the necessary total quantity limit value may be created.

The necessary black quantity calculating model creation part 23 converts the CMYK color signal generated in the lower side color gamut surface device color signals generation part 22 to the CIELAB color signals to make a pair of the converted CIELAB color signal and the black ink quantity (K) of the corresponding CMYK color signal, thereby creating the necessary black quantity calculating model. For instance, the method described in Japanese Published Unexamined Patent Application No. 2005-064774 can be applied to the CMYK color signals generated in the lower side color gamut surface device color signals generation part 22. Alternatively, the recurrence model described in Japanese Published Unexamined Patent Application No. Hei 10-262157 is used. It is possible to use any method of calculating the minimum black ink quantity required, when providing any CIELAB color signal, from the dispersedly distributed CIELAB color signal and the corresponding black ink quantity.

The necessary black ink quantity calculation part 24 calculates the necessary black ink quantity from the CIELAB color signal converted to the CMYK color signal of the CMYK printer as the output device using the necessary black ink quantity calculating model created in the necessary black ink quantity calculating model creation part 23.

The optimum black ink quantity calculation part 25 controls the degree of holding the black ink pattern according to the chroma from the minimum black ink quantity required calculated in the necessary black ink quantity calculation part 24 and the black ink quantity of the target device color signal to calculate the optimum black ink quantity. For instance, the method described in Japanese Published Unexamined Patent Application No. 2004-112269 can be applied. The construction from which the optimum black ink quantity calculation part 25 is omitted is possible. In this case, the necessary black ink quantity calculated in the necessary black ink quantity calculation part 24 may be an optimum black ink quantity.

The thus-calculated optimum black ink quantity and the CIELAB color signal provided to the necessary black ink quantity calculation part 24 are sent to the output device reverse conversion part 14 shown in FIG. 1, are converted to the CMY color signal (C'M'Y'), and are then outputted to the output device together with the optimum black ink quantity.

The construction of the optimum black ink quantity determination part 13 shown in FIG. 2 includes the necessary total quantity limit value table creation part 21, the lower side color gamut surface device color signals generation part 22, and the necessary black ink quantity calculating model creation part 23 for creating the necessary black ink quantity calculating model, and the necessary black ink quantity calculation part 24 and the optimum black ink quantity calculation part 25 actually calculating the optimum black ink quantity from any CIELAB color signal and the black ink quantity. The present invention is not limited thereto. The necessary black ink quantity calculating model is previously created. In the actual calculation of the optimum black ink quantity, the previously created necessary black ink quantity calculating model may be used without providing the necessary total quantity limit value table creation part 21, the lower side color gamut surface device color signals generation part 22, and the necessary black ink quantity calculating model creation part 23. Also in this case, the necessary black ink quantity calculating model used employs the necessary total quantity limit value according to the black ink quantity as the feature of the present invention. The necessary black ink quantity is continuous and monotonous and can be uniquely determined. It can be determined at high accuracy by preventing gradation jump from being caused.

In an example of the optimum black ink quantity determination part 13 shown in FIG. 2, the necessary black ink quantity calculating model is once created to calculate the necessary black ink quantity from the CIELAB color signal using the necessary black ink quantity calculating model. The present invention is not limited thereto. For instance, the necessary total quantity limit value is controlled according to the black ink quantity to use a function which can calculate the necessary black ink quantity (or the optimum black ink quantity) using the controlled necessary total quantity limit value. The optimum black ink quantity determination part 13 shown in FIG. 1 may determine the necessary black ink quantity or the optimum black ink quantity in real time.

Figure 8:
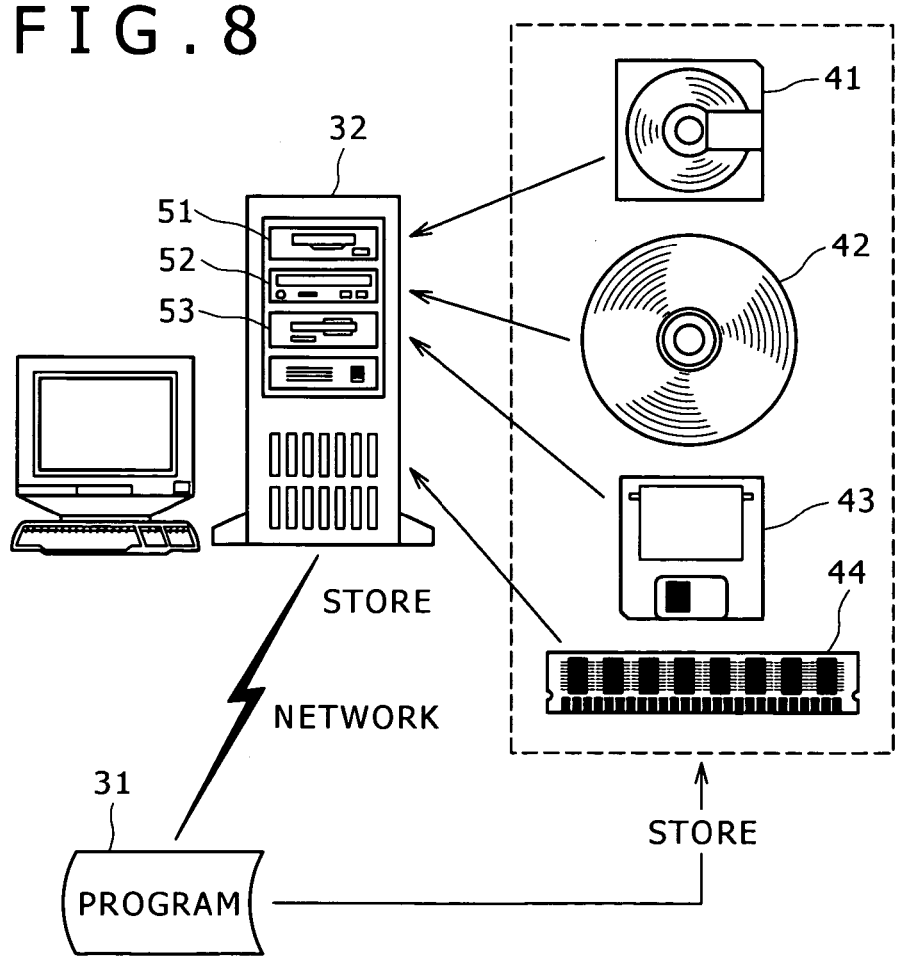
FIG. 8 is an explanatory view of an example of a computer program when realizing the function of a color processing device or a color processing method of the present invention by the computer program and a storage medium storing the computer program.

FIG. 8 is an explanatory view of an example of a computer program when realizing the function of the color processing device or the color processing method of the present invention by the computer program and a storage medium storing the computer program. In the drawing, the reference numeral 31 denotes a program, the reference numeral 32 denotes a computer, the reference numeral 41 denotes an optical magnetic disk, the reference numeral 42 denotes an optical disk, the reference numeral 43 denotes a magnetic disk, the reference numeral 44 denotes a memory, the reference numeral 51 denotes an optical magnetic disk drive; the reference numeral 52, an optical disk drive, and the reference numeral 53 denotes a magnetic disk drive.

Part or all of the above embodiment and the construction described as a modification thereof can be realized by the program 31 which can be executed by the computer. For instance, all processes shown in FIGS. 1 and 2, a process of creating the necessary black quantity calculating model shown in FIG. 2, or a process of performing color processing using the previously created necessary black ink quantity calculating model can be realized by the program. When part or all of the above embodiment and the construction described as a modification thereof is realized by the program in this manner, the program 31 and data used by the program can be stored in a storage medium readable by the computer. The storage medium causes the change state of a magnetic, optical or electric energy according to the description contents of the program to a reading device provided in a hardware resource of the computer to transmit the description contents of the program to the reading device in a signal form corresponding thereto. For instance, the storage medium includes the optical magnetic disk 41, the optical disk 42 (including a CD or DVD), the magnetic disk 43, and the memory 44 (including an IC card or a memory card). These storage media are not limited to a portable type.

The program 31 is stored in these storage media. These storage media are mounted on the optical magnetic disk drive 51, the optical disk drive 52, the magnetic disk drive 53, or a memory slot, not shown, of the computer 32 to read the program 31 from the computer, thereby executing the function of the color processing device or the color processing method of the present invention. Alternatively, a storage medium may be mounted on or incorporated into the computer 32 and the program 31 may be transferred to the computer 32 via a network to store the program 31 in the storage medium to be executed. Some functions can be configured by hardware or all functions may be configured by hardware.

As described above, according to one aspect of the present invention, a color processing device which receives an input color signal in a color space in N (N≧4) dimensions including black ink to generate an output color signal to be sent to an output device forming an image by color materials of M (M≧4) or more including black ink, includes a necessary total quantity limit value determination unit that determines a necessary total quantity limit value according to a black ink value of the input color signal, and an optimum black ink quantity determination unit that determines an optimum black ink quantity from the input color signal with the necessary total quantity limit value determined by the necessary total quantity limit value determination unit as a condition so that the optimum black ink quantity is a black ink value of the output color signal.

The present invention, when determining a black ink value of an output color signal for forming an image by an output device, does not determine only the color material total quantity limit value of the output device as a condition unlike the related art, but controls a necessary total quantity limit value limiting a color material total quantity according to a black ink value of an input color signal. For instance, to prevent the intersection of the lower side color gamut surfaces as shown in FIG. 9B from being caused, a stricter necessary total quantity limit value according to a black ink value even within the color material total quantity limit value range is set to determine a black ink value and other color values of an output color signal with the necessary total quantity limit value as a condition.

As a more specific construction, when a target device color signal in a target device in a color space in N (N≧4) dimensions or more including black ink is converted to an output device color signal in an output device in a color space in M (M≧4) dimensions or more including black ink, a model calculating a corresponding necessary black ink quantity from a device-independent color signal is created by determining a necessary total quantity limit value for each black ink value so that lower side color gamut surfaces for respective black ink values each formed of the device-independent color signal corresponding to the output device color signal in which any color material except for black ink is 100% or is equal to a color material total quantity limit value of the output device do not intersect each other and by calculating the device-independent color signal forming the lower side color gamut surface corresponding to the black ink value from the necessary total quantity limit value for each black ink value. The target device color signal is converted to the device-independent color signal, the necessary black ink quantity to the device-independent color signal is calculated from the converted device-independent color signal and the black ink value of the target device color signal using the previously created model, and the black ink value of the output device color signal for the output device is calculated from the necessary black ink quantity and the black ink value of the target device color signal. The output device color signal except for black ink is calculated from the converted device-independent color signal and the calculated black ink value of the output device color signal to obtain the output device color signal.

According to the present invention, a necessary total quantity limit value is controlled according to a black ink value of an input color signal, and for instance, the necessary total quantity limit value is controlled for each black ink value so that lower side color gamut surfaces for respective black ink values of an output device on which a color material total quantity limit is imposed, in a color space in four dimensions or more including black ink do not intersect each other in a device-independent color space. A minimum black ink quantity required having continuity and monotony can be uniquely determined to reproduce any device-independent color signal by the output device. Color conversion from the target device to the output device can be executed at high accuracy by preventing gradation jump from being caused.

The foregoing description of the embodiment of the present invention has been provided for the purpose of illustration and description. It is not intended to be exclusive or to limit the invention to the precise forms described. Obviously, many modifications and variations will be apparent to practitioners skilled in the art. The embodiment has been chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The entire disclosure of Japanese Patent Application No. 2005-147597 filed on May 20, 2005 including specification, claims, drawings and abstract is incorporated herein by reference in its entirety.

What is claimed is:

1. A color processing device comprising:
   a control unit that controls quantity of total ink used for outputting an image by an output device, the quantity of total ink being decided based on quantity of black ink of an input color signal;
   an optimum black ink quantity determination unit that calculates a necessary black ink quantity as a minimum black ink value required for satisfying a necessary total quantity limit value from a device-independent color signal corresponding to the input color signal to determine the optimum black ink quantity between the necessary black ink quantity and the black ink value in the input color signal; and
   a black ink control unit that controls quantity of black ink used for outputting the image by the output device,
   wherein the quantity of total ink includes the quantity of black ink used for outputting the image by the output device;
   wherein the quantity of total ink is decided based on minimum required quantity of black ink and a characteristic of the output device; and
   wherein the minimum required quantity of black ink is a minimum value required each black ink value not to intersect each other at lower side outer fringe planes.

2. The color processing device according to claim 1, wherein the lower side outer fringe plane is formed by a color signal in a device-independent color space.

3. A color processing device which receives an input color signal in a color space in N (N≧4) dimensions including black ink to generate an output color signal to be sent to an output device forming an image by color materials of M (M≧4) or more including black ink, comprising:
   a necessary total quantity limit value determination unit that determines a necessary total quantity limit value according to a black ink value of the input color signal; and
   an optimum black ink quantity determination unit that determines an optimum black ink quantity from the input color signal with the necessary total quantity limit value determined by the necessary total quantity limit value determination unit as a condition so that the optimum black ink quantity is a black ink value of the output color signal;
   wherein the optimum black ink quantity determination unit calculates a necessary black ink quantity as a minimum black ink value required for satisfying the necessary total quantity limit value from a device-independent color signal corresponding to the input color signal to determine the optimum black ink quantity between the necessary black ink quantity and the black ink value in the input color signal; and wherein the necessary total quantity limit value determination unit determines the necessary total quantity limit value to the black ink value of the input color signal so that lower side outer fringe planes for respective black ink values obtainable as the input color signal each formed of a color signal in a device-independent color space corresponding to an output color signal do not intersect each other, when the lower side color gamut surface is formed by a color signal in a device-independent color space corresponding to an output color signal or a value of any one of color components except for black ink is 100% or is equal to a color material total quantity limit value of the output device do not intersect each other.

4. A color processing device which converts a target device color signal in a target device in a color space in N (N≧4) dimensions or more including black ink to an output device color signal in an output device in a color space in M (M≧4) dimensions or more including black ink, comprising:
   a first color conversion unit that converts the target device color signal to a device-independent color signal;
   an optimum black ink quantity determination unit that calculates a black ink value of the output device color signal suitable for the output device from the device-independent color signal converted by the first color conversion unit and a black ink value of the target device color signal; and
   a second color conversion unit that calculates the output device color signal except for black ink from the device-independent color signal converted by the first color conversion unit and the black ink value of the output device color signal, wherein the optimum black ink quantity determination unit uses a previously created model calculating a corresponding necessary black ink quantity from the device-independent color signal to calculate the necessary black ink quantity to the device-independent color signal converted by the first color conversion unit and to calculate the black ink value of the output device color signal from the necessary black ink quantity and the black ink value of the target device color signal, and the model calculating the corresponding necessary black ink quantity from the device-independent color signal is created by determining a necessary total quantity limit value for each black ink value so that lower side outer fringe planes for respective black ink values each formed of the device-independent color signal corresponding to the output device color signal in which any one of color materials except for black ink is 100% or is equal to a color material total quantity limit value of the output device do not intersect each other and by calculating the device-independent color signal forming the lower side color gamut surface outer fringe plane corresponding to the black ink value from the necessary total quantity limit value for each of the black ink values.

5. A color processing device which creates a model calculating a corresponding black ink value from a device-independent color signal, comprising:
   a necessary total quantity determination unit that determines a necessary total quantity limit value for each black ink value so that lower side outer fringe planes for respective black ink values each formed of a device-independent color signal corresponding to an output device color signal in which a value of any one of color components except for black ink is 100% or is equal to a color material total quantity limit value of an output device do not intersect each other;

an optimum black ink quantity determination unit that calculates a necessary black ink quantity as a minimum black ink value required for satisfying a necessary total quantity limit value from a device-independent color signal corresponding to an input color signal to determine the optimum black ink quantity between the necessary black ink quantity and the black ink value in the input color signal;

a device color signals generation unit that calculates output device color signals satisfying the corresponding necessary total quantity limit value for each of the black ink values based on the necessary total quantity limit value for each of the black ink values; and a necessary black ink quantity calculating model creation unit that creates a model calculating a minimum black ink value required, when providing any device-independent color signal, from the device-independent color signal corresponding to the output device color signals calculated by the device color signals generation unit and a black ink value corresponding to the output device color signals.

6. A color processing method which receives an input color signal in a color space in N (N≧4) dimensions including black ink to generate an output color signal to be sent to an output device forming an image by color materials of M (M≧4) or more including black ink, comprising:

determining a necessary total quantity limit value according to a black ink value of a device-independent color signal corresponding to the input color signal; and determining an optimum black ink quantity from the input color signal with the determined necessary total quantity limit value as a condition so that the optimum black ink quantity is a black ink value of the output color signal;

wherein the necessary total quantity limit value to the black ink value of the input color signal is determined so that lower side outer fringe planes for respective black ink values obtainable as the input color signal each formed of a color signal in a device-independent color space corresponding to an output color signal in which a value of any one of color components except for black ink is 100% or is equal to a color material total quantity limit value of the output device do not intersect each other.

7. The color processing method according to claim 6, wherein a necessary black ink quantity as a minimum black ink value required for satisfying the necessary total quantity limit value is calculated from a device-independent color signal corresponding to the input color signal to determine the optimum black ink quantity between the necessary black ink quantity and the black ink value in the input color signal.

8. A color processing method which converts a target device color signal in a target device in a color space in N (N≧4) dimensions or more including black ink to an output device color signal in an output device in a color space in M (M≧4) dimensions or more including black ink, comprising:

converting the target device color signal to a device-independent color signal;

calculating a necessary black ink quantity as a minimum black ink value required for satisfying a necessary total quantity limit value from a device-independent color signal corresponding to an input color signal to determine the optimum black ink quantity between the necessary black ink quantity and the black ink value in the input color signal;

calculating a black ink value of the output device color signal suitable for the output device from the converted device-independent color signal and a black ink value of the target device color signal; and calculating the output device color signal except for black ink from the converted device-independent color signal and the calculated black ink value of the output device color signal, wherein a previously created model calculating a corresponding black ink value from the device-independent color signal is used to calculate a necessary black ink quantity to the device-independent color signal and to calculate the black ink value of the output device color signal from the necessary black ink quantity and the black ink value of the target device color signal, and the model calculating the corresponding black ink quantity from the device-independent color signal is created by determining a necessary total quantity limit value for each black ink value so that lower side outer fringe planes for respective black ink values each formed of the device-independent color signal corresponding to the output device color signal in which any one of color materials except for black ink is 100% or is equal to a color material total quantity limit value of the output device do not intersect each other and by calculating the device-independent color signal forming the lower side outer fringe plane corresponding to the black ink value from the necessary total quantity limit value for each of the black ink values.

9. A color processing method which creates a model calculating a corresponding black ink value from a device-independent color signal, comprising:

determining a necessary total quantity limit value for each black value so that lower side outer fringe planes for respective black ink values each formed of a device independent color signal corresponding to an output device color signal in which a value of any one of color components except for black ink is 100% or is equal to a color material total quantity limit value of an output device do not intersect each other;

determining an optimum black ink quantity between the necessary total quantity limit value and a black ink value in the device-independent color signal;

calculating output device color signals satisfying a corresponding necessary total quantity limit value for each of the black ink values based on the necessary total quantity limit value for each of the black ink values; and creating a model calculating a minimum black ink value required, when providing any device-independent color signal, from the device-independent color signal corresponding to the calculated output device color signals and a black ink value corresponding to the output device color signals.

* * * * *